(12) United States Patent
Hoskins et al.

(10) Patent No.: US 9,393,901 B2
(45) Date of Patent: Jul. 19, 2016

(54) TURN SIGNAL SYSTEMS AND METHODS

(71) Applicant: Kostal of America, Troy, MI (US)

(72) Inventors: Steven R. Hoskins, Walled Lake, MI (US); Michael F. Tefend, Lake Orion, MI (US)

(73) Assignee: Kostal of America, Troy, MI (US)

( * ) Notice: Subject to any disclaimer, the term of this patent is extended or adjusted under 35 U.S.C. 154(b) by 200 days.

(21) Appl. No.: 14/336,660

(22) Filed: Jul. 21, 2014

(65) Prior Publication Data

US 2016/0016508 A1 Jan. 21, 2016

(51) Int. Cl.
*B60Q 1/34* (2006.01)
*B60Q 1/40* (2006.01)

(52) U.S. Cl.
CPC . *B60Q 1/343* (2013.01); *B60Q 1/40* (2013.01)

(58) Field of Classification Search
CPC ........ B60Q 1/425; B60Q 1/40; B60Q 1/1469; B60Q 9/008; G05G 5/03; H01H 2003/008; H01H 2215/05; H01H 25/04; H01H 3/503
USPC .................................. 340/4.12, 436
See application file for complete search history.

(56) References Cited

U.S. PATENT DOCUMENTS

| | | | |
|---|---|---|---|
| 3,914,566 A | 10/1975 | Wendling | |
| 4,503,296 A * | 3/1985 | Iwata | B60Q 1/425 200/288 |
| 5,260,685 A * | 11/1993 | Parker | B60Q 1/40 340/476 |
| 5,575,177 A | 11/1996 | Poleschuk et al. | |
| 5,773,776 A | 6/1998 | Uleski et al. | |
| 6,237,437 B1 | 5/2001 | Takahashi | |
| 6,445,288 B1 * | 9/2002 | Pittman | B60Q 1/40 340/465 |
| 6,660,951 B2 | 12/2003 | Uchiyama | |
| 8,248,363 B2 * | 8/2012 | Anastas | G06F 3/016 345/156 |
| 2002/0056629 A1 * | 5/2002 | Sano | B60Q 1/425 200/327 |
| 2004/0090318 A1 * | 5/2004 | Rothkop | B60Q 9/008 340/435 |
| 2004/0206611 A1 * | 10/2004 | Kobayashi | B60Q 1/1469 200/10 |
| 2008/0119993 A1 * | 5/2008 | Breed | A01C 7/102 701/46 |
| 2009/0027186 A1 * | 1/2009 | DeWitt, III | B60Q 1/425 340/476 |

* cited by examiner

*Primary Examiner* — Fekadeselassie Girma
(74) *Attorney, Agent, or Firm* — Linda D. Kennedy; Bill C. Panagos; Butzel Long, P.C.

(57) ABSTRACT

Methods and systems are provided pertaining to a turn signal. AUTO CANCEL of a turn signal may be performed electrically, eliminating cancelling pawls and undesirable noise emanating from such pawls as they click against conventional structure in predominantly mechanical turn signal systems. An electromagnetic brake may dampen or prevent turn signal stalk movement if an object is in a blind spot of a vehicle. Such brake may be released or canceled electronically and quietly.

4 Claims, 4 Drawing Sheets

TURN SIGNAL SYSTEMS AND METHODS

TECHNICAL FIELD

The present disclosure relates to turn signals in vehicles, including but not limited to automotive vehicles.

BACKGROUND

Turn signal systems have been in vehicles for decades. Certain varieties of conventional turn signal systems and cancelling structures and methods for same are disclosed in, for example, U.S. Pat. Nos. 3,914,566; 5,260,685; 5,575,177; 5,773,776; 6,237,437 and 6,660,951, each of which is incorporated by reference in its entirety.

Many conventional turn signal systems use cancellation pawls, which click and cause noises that some operators may find to be objectionable. For example, there may be an audible tick of a cancel pawl bypass when a steering wheel is rotated in the direction indicated by the turn signal stalk (sometimes referred to as a lever). There may be a mechanical sounding click when the turn signal AUTO CANCELs, after for example, a turn has been completed. There may also be mechanical audible feedback during a mechanical override when a driver (sometimes referred to as an operator) causes a steering wheel to turn in the direction not indicated by the turn signal stalk. It may be desirable to eliminate some or all of such audibly detectable noises in the cabin of a vehicle.

Additionally, conventional turn signal systems may not be adapted to be responsive to the environment. For example, if an object (such as a target vehicle) is in a blind spot of the vehicle, conventional turn signal systems may nevertheless permit a driver to indicate a turn in a direction that would likely cause a collision with the object. It may be desirable to implement systems where such an object would be sensed, and an electronically controlled device could be used to damp or prevent movement of a turn signal stalk. In other words, it may be desirable to provide tactile feedback to a driver attempting to turn into a hazard to provide a warning that such a turn may be ill-advised.

Features and advantages of the present disclosure will become readily appreciated as the same becomes better understood after reading the following description when considered in conjunction with the accompanying drawings.

DETAILED DESCRIPTION

Figure 1:
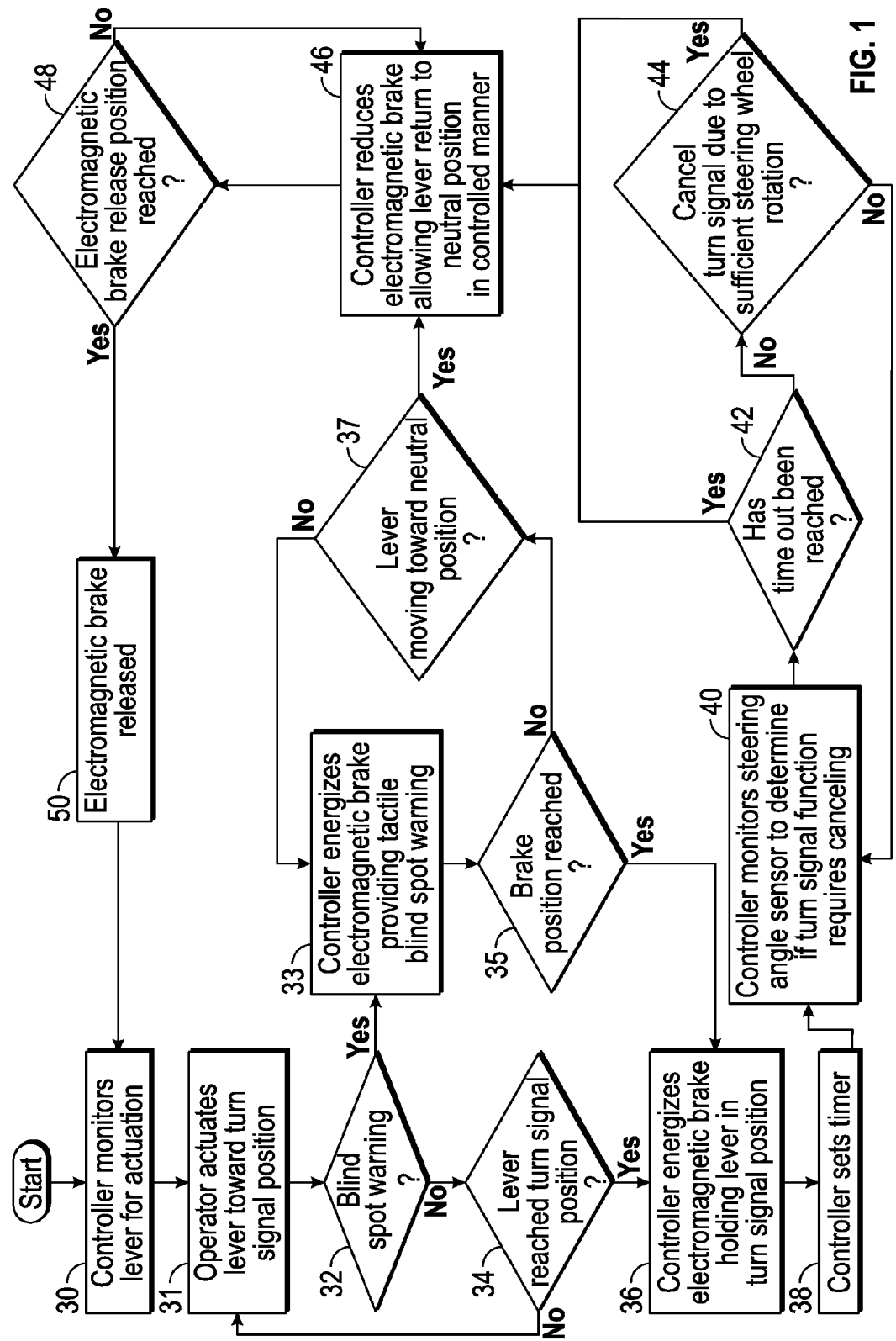
FIG. 1 is an flow chart of a series of exemplary methods, any one or more of which may be used in connection with turn signal systems.

Referring to the following description and drawings, exemplary approaches to the disclosed systems are detailed. Although the drawings represent some possible approaches, the drawings are not necessarily to scale and certain features may be exaggerated, removed, or partially sectioned to better illustrate and explain the disclosed devices. Further, the description below is not intended to be exhaustive, nor is it to limit the claims to the precise forms and configurations described and/or shown in the drawings.

Referring to FIG. 1, exemplary methods are shown in combination for use in connection with a turn signal system. Initially, in box 30, a controller is configured to monitor whether a turn signal has been actuated. One way of doing this is to use equipment such as one or more sensors to communicate to a controller whether the lever or turn signal stalk has changed position. Box 31 assumes movement has been sensed—that a driver has actuated the turn signal stalk and that a directly or indirectly resultant signal was sent to a controller to so indicate.

Many vehicles, including automotive vehicles, are equipped with various sensing systems and related controllers to determine whether a potential object is in a blind spot. Such systems are sometimes referred to as crash avoidance systems. Other terminology may be used to describe crash avoidance systems; the phrase "crash avoidance systems" is meant to be general and to encompass collision prevention systems, and other like phraseology.

Starting at decision box 32, a controller is configured to evaluate whether a sensor, series of sensors or a crash avoidance system has detected an object such as a target vehicle in a blind spot of a host vehicle. Such blind spot data or information may be sent to the controller directly from a sensor or indirectly through the vehicle bus. If there is no object in a blind spot, the controller operates in a business-as-usual manner, generally permitting the driver or operator to move the turn signal stalk to the position desired without tactile feedback. At decision box 34, it is determined whether the turn signal stalk or lever has reached its intended turn signal position. If it has not, the operator or driver keeps moving the lever until it arrives in position. If it has, then the flow moves to box 36, where the controller directly or indirectly energizes a tactile feedback device such as an electromagnetic brake to hold the turn signal stalk or lever in position.

Returning to decision box 32, if an object is in a blind spot of the host vehicle, the decision flow reaches box 33. A controller having received data that an object is in a blind spot causes a signal to be sent, directly or indirectly, to a tactile feedback device such as an electromagnetic brake in communication with a turn signal stalk. The electromagnetic brake may provide tactile feedback according to predetermined configurations. That is, the predetermined tactile feedback may be an absolute bar to movement—a prevention of movement—of the turn signal stalk in one embodiment. In another embodiment, the predetermined tactile feedback may provide a ratcheting effect of increasing resistance to move the turn signal stalk. This tactile feedback may warn the driver, optionally along with other feedback (visual and/or auditory) from a crash avoidance system, against moving into a position where the vehicle may crash with the object that is (or was, depending upon temporal conditions) hidden in a blind spot.

At decision box 35, it is determined whether the energized tactile feedback device or electromagnetic brake has reached the intended position. If it has, the flow moves to box 36. The flow also moves to box 36 if there was no object detected in the blind spot, and the turn signal stalk reached its intended position.

In box 36, a controller causes the tactile feedback device to be energized hold the lever or turn signal stalk in the intended position. Then, in box 38, the controller causes a timer to be set. In box 40, a controller receives input directly or indirectly from a steering angle sensor to evaluate whether the turn signal function requires cancelling through an AUTO CANCEL function.

At decision box 42, one of the predetermined criteria that can be met to initiate cancellation is whether the timer of box 38 has reached a time out condition. Another of the predetermined criteria that can be met to determine whether cancellation can be initiated is whether the turn has been completed based upon the data received, directly or indirectly, from a steering angle sensor. In other words, it is considered whether the turning action has been completed in decision box 44. It is contemplated that the ordering of decision box 42 and 44 may be altered, or that one decision box may be omitted from the general flow. As depicted, if neither condition is met, the flow returns to box 40 until a condition exists requiring cancellation through AUTO CANCEL.

When the answer to one or the other of decision box 42 or 44 is yes, the flow moves to box 46. At box 46, a controller sends, directly or indirectly, a signal to the tactile feedback device exemplified as an electromagnetic brake to reduce the forces applied by such brake and to allow the lever or turn signal stalk to return to a NEUTRAL position in a predetermined manner such as in a controlled manner or a snap-back manner if desired. Another way to arrive at box 46 is the situation where an object is detected in the blind spot in box 32, a controller causes a brake to be energized in box 33, but the desired brake position is not reached. Then, it is evaluated whether the lever or turn signal stalk at decision box 37 moves toward NEUTRAL position. This direction of movement may happen as a result of the driver or operator responding to the warning and releasing the turn signal lever or stalk. If the turn signal lever or stalk is moving toward a NEUTRAL position, then the flow arrives at box 46.

Box 46 leads the flow to decision box 48, where it is determined whether the electromagnetic brake release position has been reached. If so, the controller the electromagnetic brake is released in box 50. The cycle may begin over upon actuation of the turn signal stalk or lever. If not, the controller continues causing a reduction of the brake force until the condition is met, and the brake is ultimately so the cycle may begin over upon actuation of the turn signal talk or lever.

Figure 2:
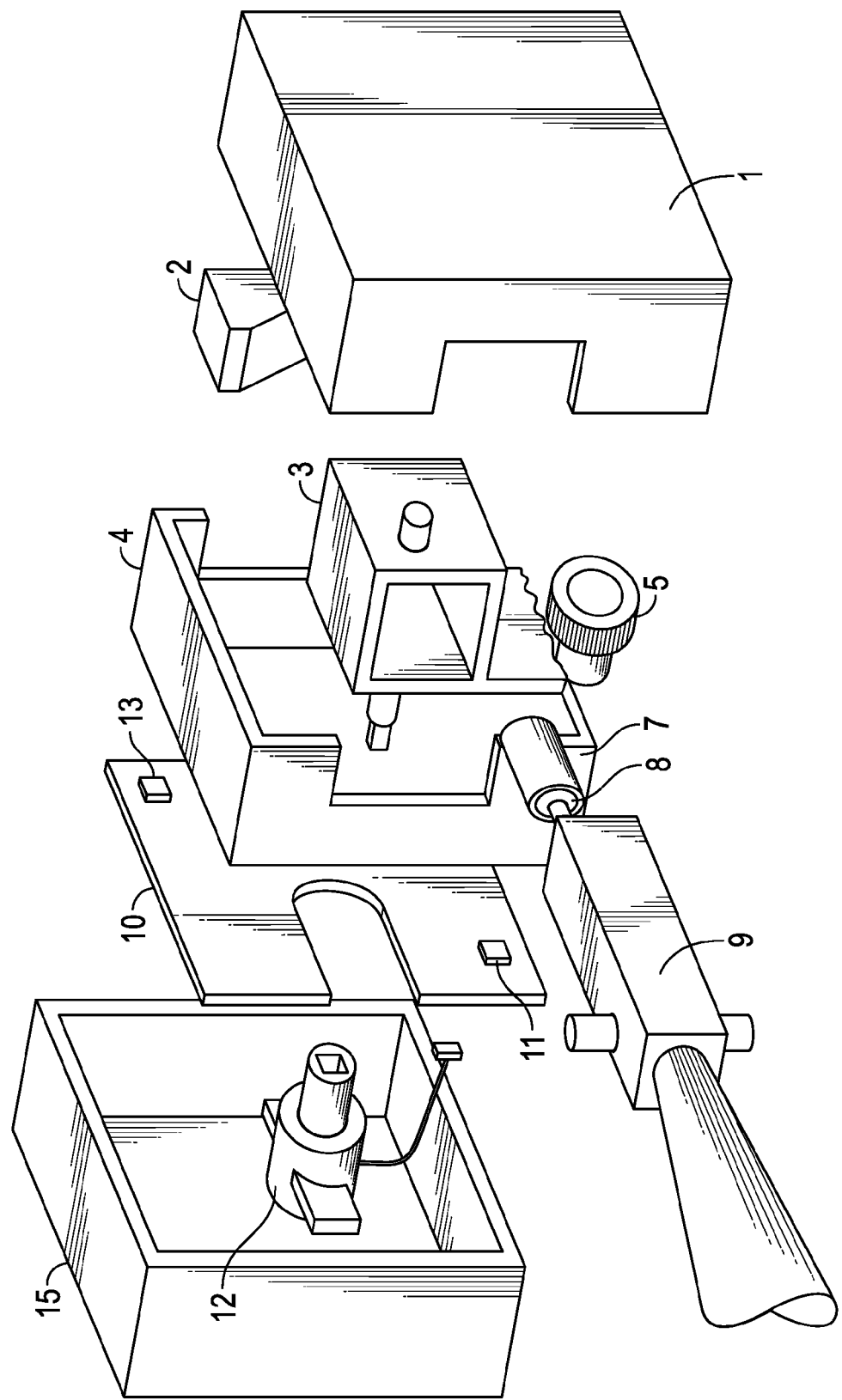
FIG. 2 is an exploded view of an exemplary turn signal system.
Figure 3:
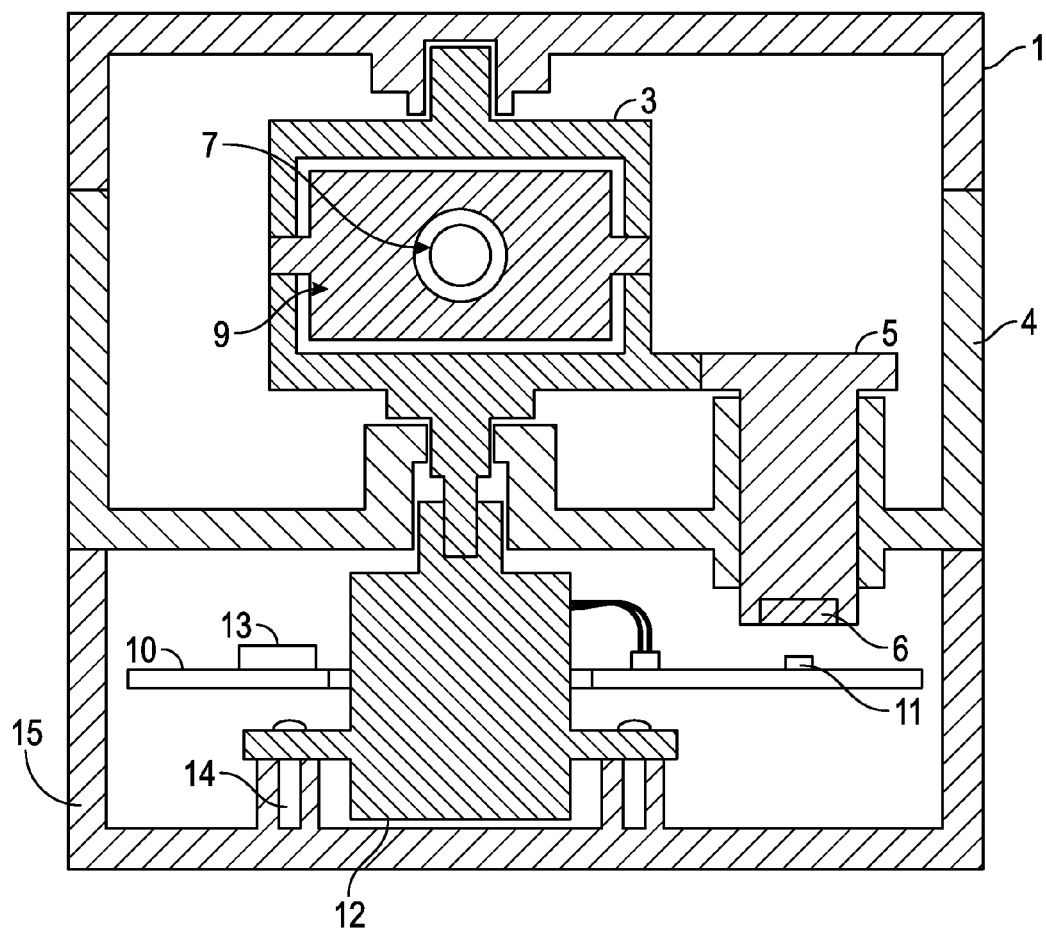
FIG. 3 is a broken away side view of an exemplary turn signal system.

Referring to FIGS. 2 and 3, an exemplary turn signal system is shown that eliminates the need for pawls in AUTO CANCEL mode. Although an electromagnetic brake is exemplified, other electromechanical tactile feedback systems are contemplated that can be driven electronically to apply tactile force to a turn signal stalk or lever. In the depicted example, the turn signal system resides in or in affiliation with a base 15, housing 4 and cover 1. Such components may be plastic, metal, a combination of both, and may be combined in (integrally formed as) one part or made from connectable and separate parts.

A controller 13 may be equipped with electronics (hardware and software) to be in communication with a vehicle bus. Controller 13 may optionally include computer readable storage media for storing data representing instructions executable by a computer or microprocessor. Computer readable storage media may include one or more of random access memory as well as various non-volatile memory such as read-only memory or keep-alive memory. Computer readable storage media may communicate with a microprocessor and input/output circuitry via a standard control/address bus. As would be appreciated by one of ordinary skill in the art, computer readable storage media may include various types of physical devices for temporary and/or persistent storage of data. Exemplary physical devices include but are not limited to DRAM, PROMS, EPROMS, EEPROMS, and flash memory.

Controller or controllers 13 are configured to monitor the stalk or lever 9 position. In one embodiment, data pertaining to the stalk 9 position is gathered through a gear interface between rotor 3 and magnet 6 located within measurement gear 5, which is positioned above a hall effect cell 11. Hall effect cell 11 and controller 13 are in electrical communication with one another and may be on the same printed circuit board (PCB) 10.

If a crash avoidance system or a external blind spot detection system or module (communicating through a vehicle bus, for example), detects an object such as a target vehicle in a blind spot, then various systems and methods may be invoked if an operator attempts to signal a turn that may cause a crash into the target vehicle. For example, controller 13 may cause a brake such as an electromagnetic brake 12 to be energized to provide tactile feedback to the operator that such turn is ill-advised. The tactile feedback may be an absolute prevention of movement, a damping of movement, or a ratcheting effect of increased resistance when an attempt to make an ill-advised turn is signaled.

In the depicted embodiment, electromagnetic brake 12 is fastened to base 15 using screws 14. Other fastening mechanisms or adhesives may be used.

If an operator releases the stalk 9 while a blind spot warning is active, spring 8 and plunger 7 may ride along a detent profile 2. This may move the stalk 9 toward the turn signal NEUTRAL position. Controller 13 is configured to monitor the stalk 9 position. While the stalk 9 moves toward the NEUTRAL position, controller 13 may reduce power to the electromagnetic brake 12 to permit the stalk 9 to continue moving toward the NEUTRAL position in a controlled manner. That is, once the stalk 9 and the rotor 3 reach the release electromagnetic brake position, the controller 13 may completely release the electromagnetic brake and the controller 13 returns to monitoring for turn signal actuation. Controlled gradual motion is an exemplary controlled manner, both other motions are contemplated. Variations of a snap back action into NEUTRAL can also programmed.

If no object or vehicle is detected, and an operator actuates a stalk 9 to indicate turn, controller 13 is configured to monitor the stalk 9 position. Once the stalk 9 reaches the desired position to indicate a turn, controller 13 will cause the electromagnetic brake to be energized to hold the stalk 9, rotor 3, measurement gear 5 and magnet 6 in the indicated turn signal position.

Controller 13 may cause a timer to be set after the above-named components are held in position. That is time may be a predetermined condition for AUTO CANCEL action. Another such predetermined condition may include steering wheel position. This may be determined by data provided through a steering angle sensor. In the depicted embodiment, if a certain predetermined amount of time has passed OR the steering wheel has moved a certain predetermined number of degrees in the indicated direction, the controller 13 may cause the electromagnetic brake to reduce the braking force, allowing spring 8 and plunger 7 to ride along the detent profile 2 to move the stalk 9 toward NEUTRAL in a controlled manner. Then, once the stalk 9 and rotor 3 reach the release electromagnetic brake position, the controller 13 causes the electromagnetic brake to be released and the controller 13 is again monitoring for operator actuation activity.

Generally, the device of FIGS. 2 and 3 is a turn signal device, comprising an electromagnetic brake in electrical communication with a controller and a turn signal stalk. The controller is configured to electronically damp stalk movement during AUTO CANCEL operations. With this electronic control, it may be possible to reduce or eliminate cancelling pawls from the mechanical turn signal devices that have sometimes been identified as causing undesirable audible effects.

Figure 4:
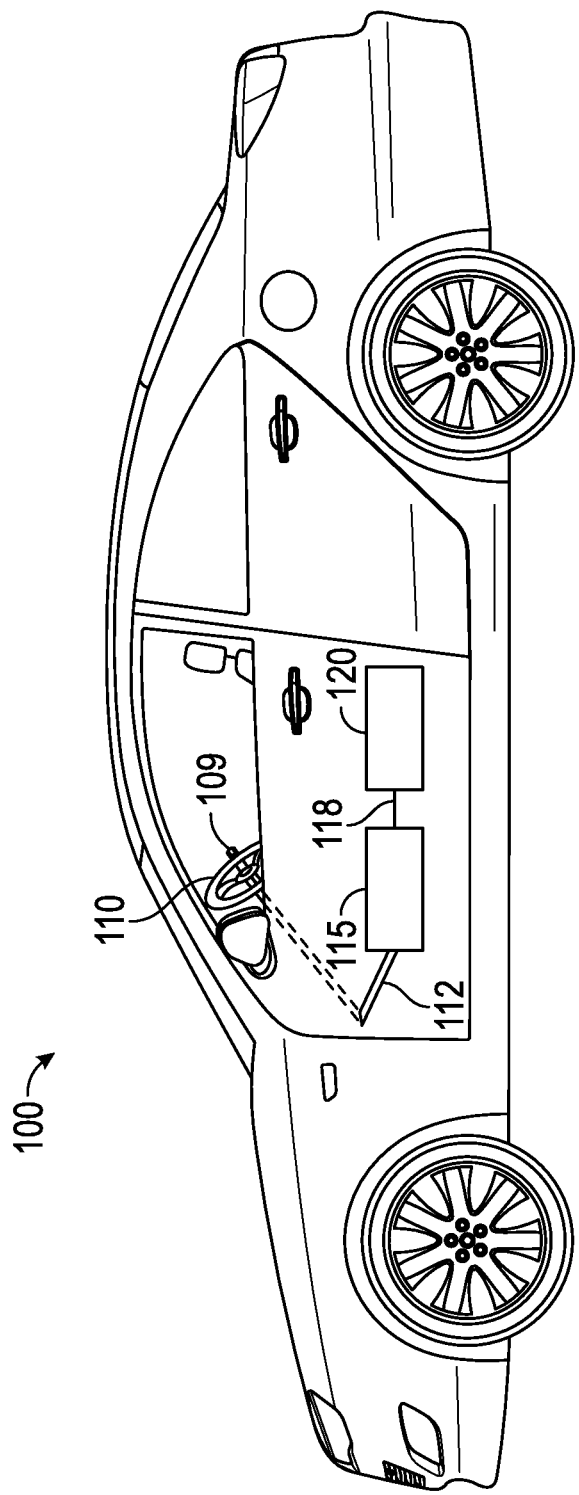
FIG. 4 is a schematic of a crash avoidance system in communication with an exemplary turn signal system in a host vehicle.

Referring to FIG. 4, a general schematic is shown where a host vehicle 100 is equipped with a turn signal system 115 and crash avoidance system 120. Systems 115 and 120 are in communication with one another through a vehicle bus having at least one wire 118. Both systems 115 and 120 are in electrical communication with a turn signal stalk 109 (which is technically part of system 115) through a vehicle bus having at least one wire 112. One or both of systems 115 and 120 may be in communication with a steering wheel system that includes steering wheel 110 and associated steering angle sensors and related controllers. It is contemplated that controllers need not be separate physical parts. The term controller can refer to one or more physical parts, and a single controller can be affiliated with one or more systems; each system does not necessarily have to have a separate controller. This is one reason why communication between systems can be either direct or indirect.

The present disclosure has been described in an illustrative manner. It is to be understood that the terminology which has been used is intended to be in the nature of words of description rather than of limitation. Many modifications and variations of the present example are possible in light of the above teachings. Therefore, within the scope of the appended claims, the present disclosure may be practices other than as specifically described.

What is claimed as new and desired to be protected by Letters Patent of the United States is:

1. A host vehicle, comprising:
   a crash avoidance system; and
   a turn signal system in electrical communication with the crash avoidance system, the turn signal system including
      a mechanism to determine whether a turn signal stalk has been actuated;
      one or more controllers that process data from received signals pertaining to whether a turn signal stalk has been actuated and whether the crash avoidance system has detected an object in a blind spot, the one or more controllers being in electrical communication with a tactile feedback device including an electromagnetic brake, the one or more controllers being configured to cause the tactile feedback device to be energized to provide a tactile warning through resistance of movement if an object is in a blind spot, the one or more controllers further being configured to cause the tactile feedback device to cancel and return a turn signal stalk to a NEUTRAL position in a controlled manner if one or more predetermined conditions are present, wherein such predetermined conditions include (i) a time out and (ii) an indicator as to whether a turn has been completed.

2. The host vehicle of claim 1 wherein the tactile warning is a prevention of movement of the turn signal stalk.

3. The host vehicle of claim 1 wherein the tactile warning is a ratcheting of increased resistance of movement of the turn signal stalk.

4. The host vehicle of claim 1 wherein a predetermined condition comprises completion of a turn based upon degrees of rotation of a steering wheel.

* * * * *